(12) United States Patent
Shih

(10) Patent No.: US 12,145,511 B2
(45) Date of Patent: Nov. 19, 2024

(54) MOBILE VEHICLE AND DAMPING ASSEMBLY

(71) Applicants: INVENTEC (PUDONG) TECHNOLOGY CORPORATION, Shanghai (CN); INVENTEC CORPORATION, Taipei (TW)

(72) Inventor: Ming-Hung Shih, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 18/207,633

(22) Filed: Jun. 8, 2023

(65) Prior Publication Data
US 2024/0300418 A1    Sep. 12, 2024

(30) Foreign Application Priority Data
Mar. 10, 2023   (CN) .......................... 202310232044.6

(51) Int. Cl.
*F16M 1/00*    (2006.01)
*B60R 11/02*   (2006.01)
*F16F 15/04*   (2006.01)
*B60R 11/00*   (2006.01)

(52) U.S. Cl.
CPC ............. *B60R 11/02* (2013.01); *F16F 15/04* (2013.01); *B60R 2011/0003* (2013.01); *B60R 2011/0052* (2013.01); *B60R 2011/008* (2013.01)

(58) Field of Classification Search
CPC ............. B60R 11/02; B60R 2011/0003; B60R 2011/0052; B60R 2011/008; F16F 15/04
See application file for complete search history.

(56) References Cited

U.S. PATENT DOCUMENTS

| | | | | |
|---|---|---|---|---|
| 3,063,732 | A * | 11/1962 | Harbers | B60G 5/047 280/81.6 |
| 3,285,281 | A * | 11/1966 | Pribonic | B60G 17/0528 137/625.25 |
| 4,964,492 | A * | 10/1990 | Joseph | F16F 9/467 188/282.4 |
| 5,303,804 | A * | 4/1994 | Spiess | F16F 9/465 188/266.8 |
| 6,029,764 | A * | 2/2000 | Schubert | F16F 15/0275 296/190.07 |
| 2006/0249343 | A1* | 11/2006 | Prottengeier | F16F 7/04 188/381 |
| 2007/0001354 | A1* | 1/2007 | Stothers | F16F 15/04 267/136 |
| 2020/0070899 | A1* | 3/2020 | Keller | B62D 55/065 |
| 2024/0239149 | A1* | 7/2024 | Loow | B60G 15/062 |

* cited by examiner

*Primary Examiner* — Amy J. Sterling
(74) *Attorney, Agent, or Firm* — Maschoff Brennan

(57) ABSTRACT

A mobile vehicle includes a vehicle body, a computer host and at least one damping assembly. The at least one damping assembly includes a mounting casing, a mounting sleeve and a damping body. The mounting casing is mounted on the vehicle body, and has an accommodation space and an opening connected to the accommodation space. The mounting sleeve is located in the accommodation space, and partially passes through the opening. The mounting sleeve is mounted on the computer host. The damping body is interposed between the mounting casing and the mounting sleeve.

4 Claims, 4 Drawing Sheets

MOBILE VEHICLE AND DAMPING ASSEMBLY

CROSS-REFERENCE TO RELATED APPLICATIONS

This non-provisional application claims priority under 35 U.S.C. § 119(a) on Patent Application No(s). 202310232044.6 filed in China, on Mar. 10, 2023, the entire contents of which are hereby incorporated by reference.

BACKGROUND OF THE INVENTION

Technical Field of the Invention

The invention relates to a damping assembly, more particularly to a damping assembly configured for a mobile vehicle.

Description of the Related Art

With the development of technology, the types of computers are increasing. In addition to the computers for household or business, vehicles will also be equipped with computers as a vehicle control system. The vehicle control system is configured to provide vehicle information or other devices such as car audio, CD player and satellite navigation system to the driver. The additional information and entertainment can be provided to the driver or the passengers via integrating the information and controlling the devices.

When the vehicle is moving, it will vibrate strongly to cause damage to the computer, and even endanger the safety of the driver or the passengers. Generally, manufacturers will install a damper on the computer case to reduce vibration and prevent the computer from being damaged. However, currently, the elastic body of the damper is easily broken and falls off due to the scratches of the surrounding metal casing during strong vibration, so that the damping function of damper cannot be performed. Therefore, an improvement of the structural strength of the damper to protect the vehicle computer under strong vibration is an important issue to be solved.

SUMMARY OF THE INVENTION

The invention provides a mobile vehicle and a damping assembly to improve the structural strength of the damper to protect the vehicle computer under strong vibration.

One embodiment of the invention provides a mobile vehicle including a vehicle body, a computer host and at least one damping assembly. The at least one damping assembly includes a mounting casing, a mounting sleeve and a damping body. The mounting casing is mounted on the vehicle body. The mounting casing has an accommodation space and an opening connected to the accommodation space. The mounting sleeve is located in the accommodation space, and partially passes through the opening. The mounting sleeve is mounted on the computer host. The damping body is interposed between the mounting casing and the mounting sleeve.

Another embodiment of the invention provides a damping assembly configured to assemble a vehicle body with a computer host. The damping assembly includes a mounting casing, a mounting sleeve and a damping body. The mounting casing is mounted on the vehicle body. The mounting casing has an accommodation space and an opening connected to the accommodation space. The mounting sleeve is located in the accommodation space, and partially passes through the opening. The mounting sleeve is mounted on the computer host. The damping body is interposed between the mounting casing and the mounting sleeve.

According to the mobile vehicle and the damping assembly disclosed by above embodiments, since the damping body is located in the mounting casing, the damping body may not be damaged easily due to improving the structural strength of the damping body, and the damping body may also not fall out of the mounting casing even if it breaks due to aging or strong vibration. Therefore, the damping function of the damping body can be maintained to protect the computer host under strong vibration.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION

Figure 1:
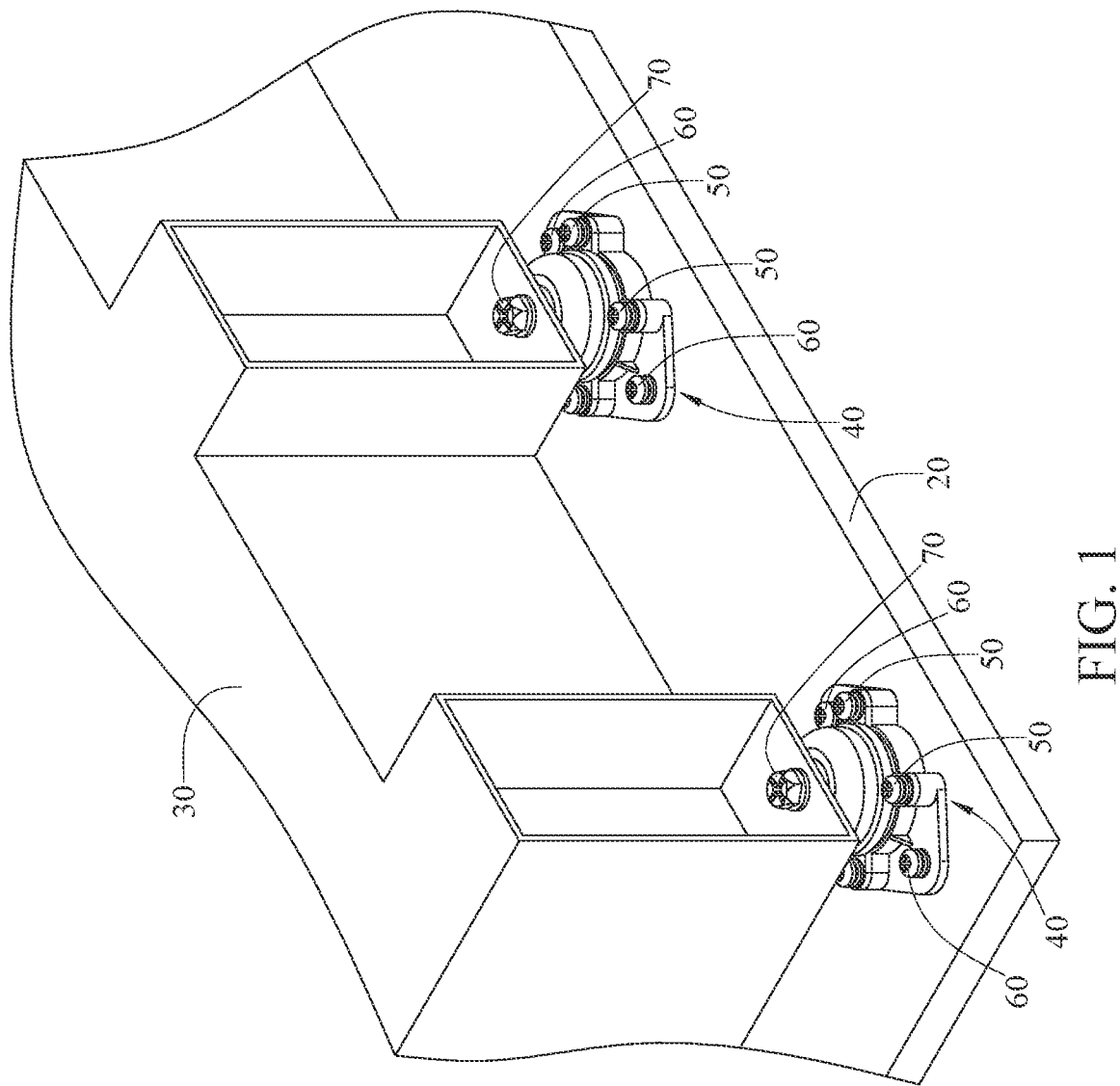
FIG. 1 is a perspective view of a mobile vehicle in accordance with one embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present invention, such as technical and scientific terms, have its own meanings and can be comprehended by those skilled in the art, unless the terms are additionally defined in the present invention. That is, the terms used in the following paragraphs should be read on the meaning commonly used in the related fields and will not be overly explained, unless the terms have a specific meaning in the present invention.

Please refer to FIG. 1, which is a perspective view of a mobile vehicle 10 in accordance with one embodiment of the invention. In this embodiment, the mobile vehicle 10 includes a vehicle body 20, a computer host 30, a plurality of damping assemblies 40, a plurality of first fasteners 50, a plurality of second fasteners 60 and a third fastener 70. The vehicle body 20 is, for example, a car. The computer host 30 is, for example, a vehicle computer.

Figure 2:
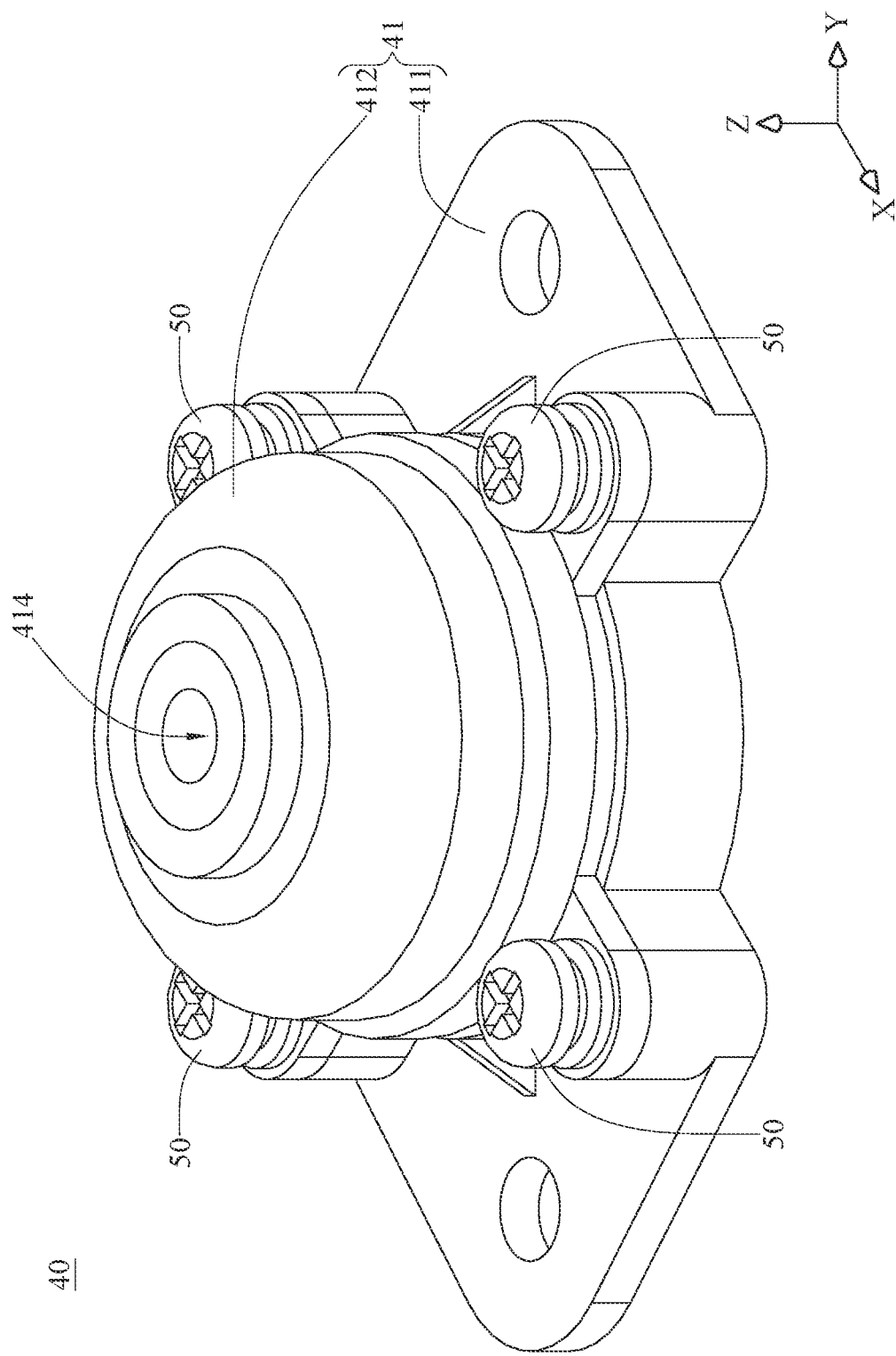
FIG. 2 is a perspective view of one of the damping assemblies of the mobile vehicle in FIG. 1.
Figure 3:
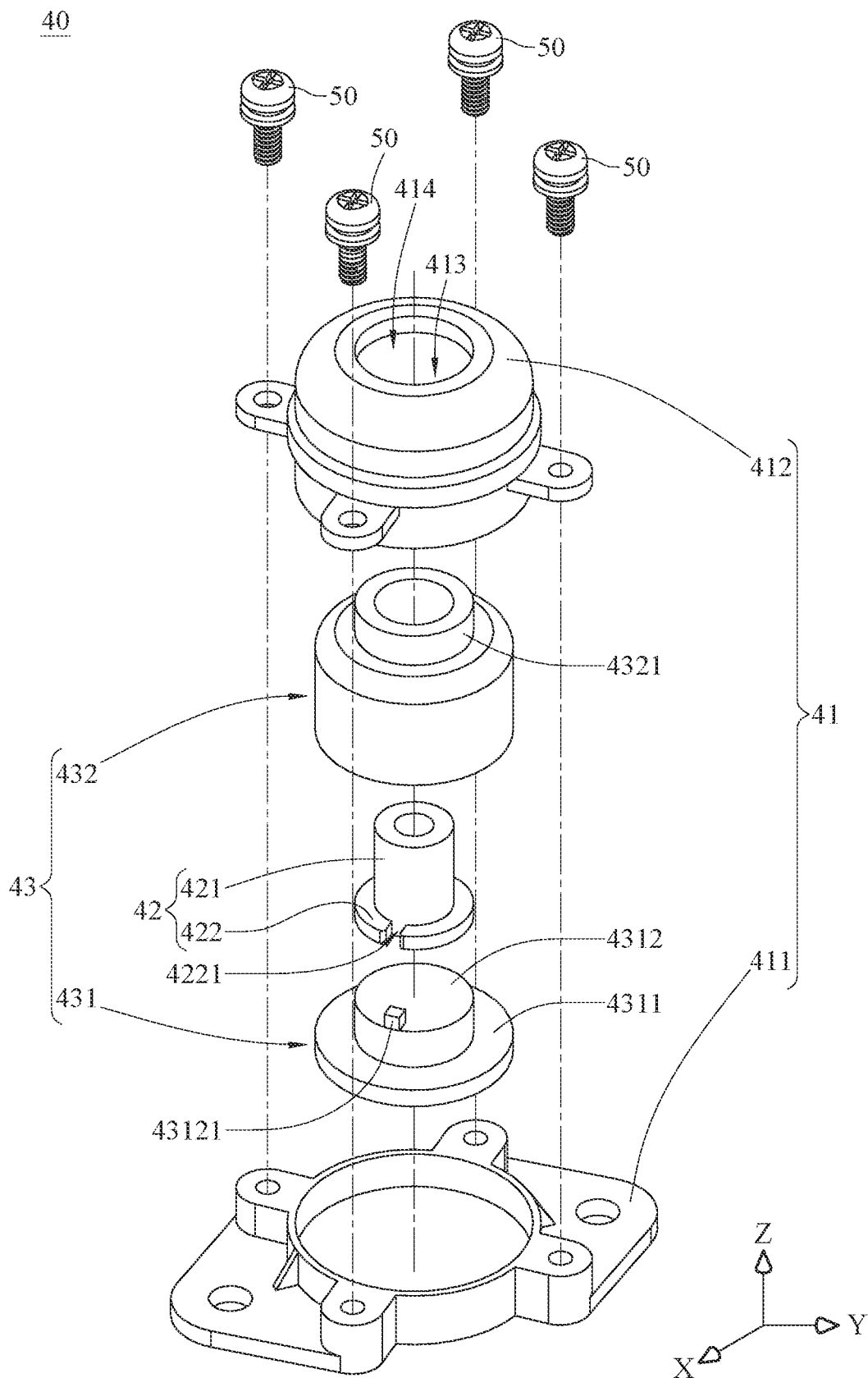
FIG. 3 is an exploded view of one of the damping assemblies of the mobile vehicle in FIG. 2.
Figure 4:
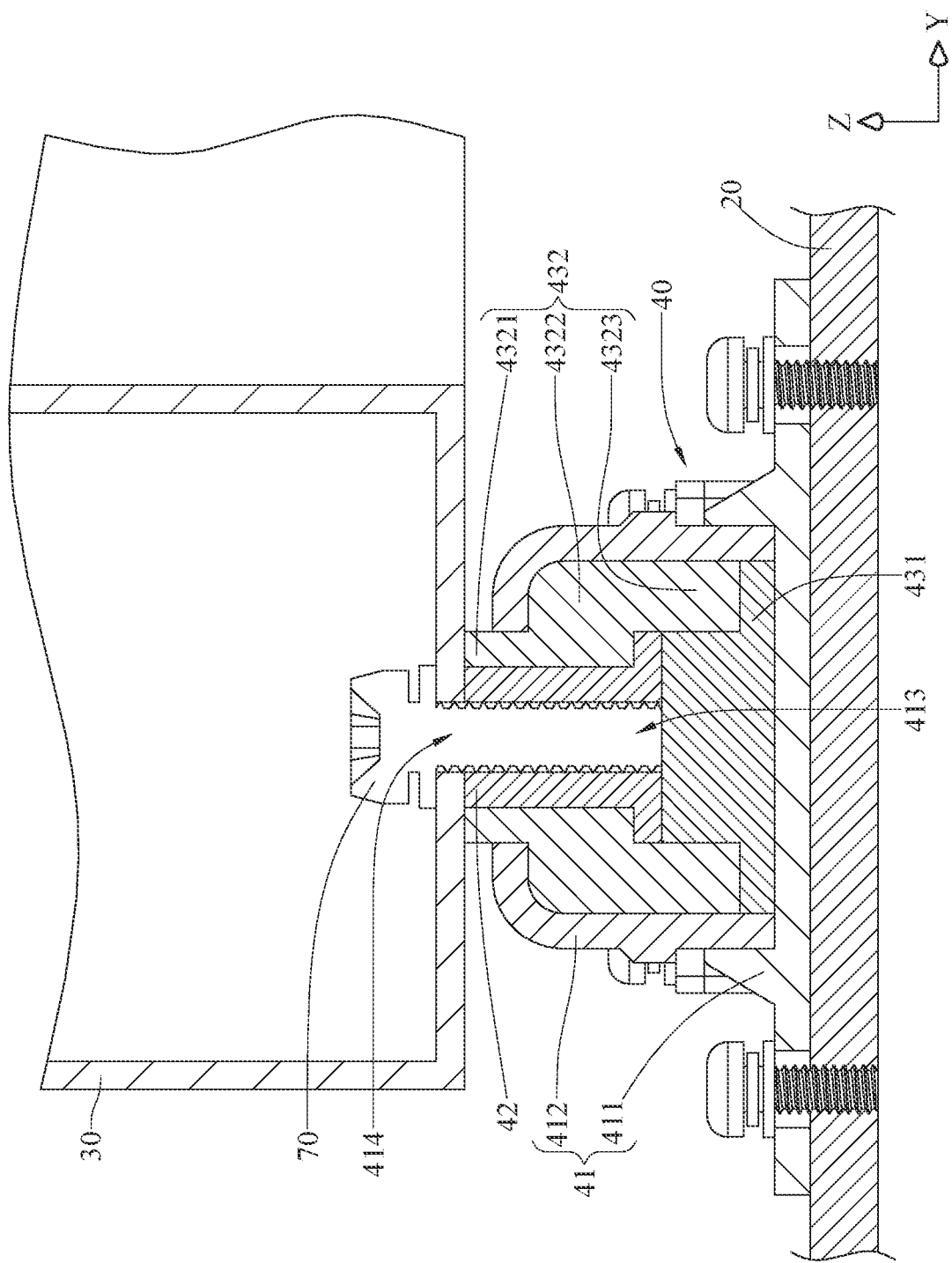
FIG. 4 is a cross-sectional view of the mobile vehicle in FIG. 1.

Please refer to FIG. 2 to FIG. 4, where FIG. 2 is a perspective view of one of the damping assemblies 40 of the mobile vehicle 10 in FIG. 1, FIG. 3 is an exploded view of one of the damping assemblies 40 of the mobile vehicle 10 in FIG. 2, and FIG. 4 is a cross-sectional view of the mobile vehicle 10 in FIG. 1.

Each of the plurality of damping assemblies 40 includes a mounting casing 41, a mounting sleeve 42 and a damping body 43. The mounting casing 41 is mounted on the vehicle body 20, and includes a plate portion 411 and a cover portion 412. The plate portion 411 and the cover portion 412 of the mounting casing 41 are fastened via the plurality of first fasteners 50 so as to together surround an accommodation space 413. The cover portion 412 has an opening 414 connected to the accommodation space 413. Each of the plurality of damping assemblies 40 is fastened to the vehicle body 20 via the plurality of second fasteners 60 fastened to the plate portion 411.

The mounting sleeve 42 is located in the accommodation space 413, and partially passes through the opening 414. The mounting sleeve 42 is mounted on the computer host 30. The mounting sleeve 42 includes a sleeve portion 421 and a blocking protrusion portion 422. The blocking protrusion portion 422 protrudes from a periphery of the sleeve portion 421. The third fastener 70 passes through a casing of the computer host 30 and the opening 414, and is inserted into the mounting sleeve 42, so that each of the plurality of damping assemblies 40 is fastened to the computer host 30. The cover portion 412 is mounted on the plate portion 411. In addition, the plurality of first fasteners 50, the plurality of second fasteners 60 and the third fastener 70 are, for example, screws.

The damping body 43 is located in the mounting casing 41, and the mounting sleeve 42 is located in the damping body 43. That is, the damping body 43 is interposed between the mounting casing 41 and the mounting sleeve 42. Accordingly, the damping body 43 can inhibit or reduce the vibration transmitted from the vehicle body 20 to the computer host 30. The damping body 43 includes a first damping member 431 and a second damping member 432. The first damping member 431 is interposed between the mounting sleeve 42 and the plate portion 411. The first damping member 431 includes a base portion 4311 and a carrying portion 4312. The base portion 4311 is stacked on the plate portion 411. The carrying portion 4312 protrudes from the base portion 4311. The mounting sleeve 42 is stacked on the carrying portion 4312. The second damping member 432 is stacked on the first damping member 431, and surround the mounting sleeve 42. That is, the blocking protrusion portion 422 of the mounting sleeve 42 is interposed between the first damping member 431 and the second damping member 432 to prevent the damping body 43 from moving along the direction on Z-axis.

The second damping member 432 includes a first extension portion 4321, a ring portion 4322 and a second extension portion 4323. The ring portion 4322 physically touches the sleeve portion 421 and surrounds a part of the sleeve portion 421. The first extension portion 4321 is connected to a side of the ring portion 4322. The first extension portion 4321 passes through the opening 414 to physically touch the sleeve portion 421 and surrounds another part of the sleeve portion 421. The second extension portion 4323 is connected to another side of the ring portion 4322 to physically touch the blocking protrusion portion 422 and the carrying portion 4312 and surrounds the blocking protrusion portion 422 and the carrying portion 4312.

In this embodiment, the advantage of the damping body 43 located in the mounting casing 41 and covering the a part of the mounting sleeve 42 is that the mounting casing 41 can protect the damping body 43 to improve the overall structural strength of the damping body 43, so that the damping body 43 may not be damaged easily. Even if the damping body 43 breaks due to aging or strong vibration, it may not fall out of the mounting casing 41, thereby maintaining the damping function to protect the computer host 30 from strong vibration.

In this embodiment, the blocking protrusion portion 422 of the mounting sleeve 42 has a first positioning structure 4221. The carrying portion 4312 of the first damping member 431 has a second positioning structure 43121. The first positioning structure 4221 is, for example, a recess recessed inward from the blocking protrusion portion 422, and the second positioning structure 43121 is, for example, a convex block protruding outward from the carrying portion 4312. The first positioning structure 4221 and the second positioning structure 43121 match each other, and the second positioning structure 43121 is positioned at the first positioning structure 4221 to prevent the mounting sleeve 42 from rotating relative to the first damping member 431.

In this embodiment, the blocking protrusion portion 422 of the mounting sleeve 42 has one first positioning structure 4221, the carrying portion 4312 of the first damping member 431 has one second positioning structure 43121, and the first positioning structure 4221 and the second positioning structure 43121 match each other, but the present invention is not limited thereto. In other embodiments, the blocking protrusion portion of the mounting sleeve may have two or more first positioning structures, the carrying portion of the first damping member may have two or more second positioning structures, and each of the first positioning structures and each of the second positioning structures match each other.

In this embodiment, the first positioning structure 4221 is a recess recessed inward from the blocking protrusion portion 422, the second positioning structure 43121 is a convex block protruding outward from the carrying portion 4312, and the first positioning structure 4221 and the second positioning structure 43121 match each other, but the present invention is not limited thereto. In other embodiments, the first positioning structure may be a convex block protruding outward from the blocking protrusion portion, the second positioning structure may be a recess recessed inward from the carrying portion, and the first positioning structure and the second positioning structure match each other.

In this embodiment, the mobile vehicle 10 includes one third fastener 70, and each of the plurality of damping assemblies 40 is fastened to the computer host 30 via the third fastener 70, but the present invention is not limited thereto. In other embodiments, the mobile vehicle may include two or more third fasteners, and each of the plurality of damping assemblies is fastened to the computer host via respective third fastener.

According to the mobile vehicle and the damping assembly disclosed by above embodiments, since the damping body is located in the mounting casing, the damping body may not be damaged easily due to improvement the structural strength of the damping body, and the damping body may also not fall out of the mounting casing even if it breaks due to aging or strong vibration. Therefore, the damping function of the damping body can be maintained to protect the computer host under strong vibration.

In the embodiment of the present invention, the mobile vehicle and damping assembly of the present invention can be applied to vehicle-mounted devices, such as autonomous vehicles, electric vehicles or semi-autonomous vehicles.

It will be apparent to those skilled in the art that various modifications and variations can be made to the present invention. It is intended that the specification and examples be considered as exemplary embodiments only, with the scope of the invention being indicated by the following claims and their equivalents.

What is claimed is:

1. A mobile vehicle, comprising:
   a vehicle body;
   a computer host; and at least one damping assembly, comprising a mounting casing, a mounting sleeve and a damping body, the mounting casing has an accommodation space and an opening connected to the accommodation space, wherein the mounting casing comprises a plate portion and a cover portion, the plate portion is mounted on the vehicle body, the cover portion is mounted on the plate portion, so that the plate portion and the cover portion together form the accommodation space, the opening is located on the cover portion, the mounting sleeve is located in the accommodation space and partially passes through the opening, the mounting sleeve is mounted on the computer host, wherein the mounting sleeve comprises a sleeve portion and a blocking protrusion portion, the blocking protrusion portion protrudes from a periphery of the sleeve portion, the damping body is interposed between the mounting casing and the mounting sleeve, wherein the damping body comprises a first damping member and a second damping member, the first damping member is interposed between the mounting sleeve and the plate portion, the second damping member is stacked on the first damping member, and surround the mounting sleeve.

2. The mobile vehicle according to claim 1, wherein the first damping member comprises a base portion and a carrying portion, the base portion is stacked on the plate portion, the carrying portion protrudes from the base portion, the mounting sleeve is stacked on the carrying portion, the second damping member comprises a ring portion, a first extension portion and a second extension portion, the ring portion physically touches the sleeve portion, and surround a part of the sleeve portion, the first extension portion is connected to a side of the ring portion, the first extension portion passes through the opening to physically touches the sleeve portion and surrounds another part of the sleeve portion, the second extension portion is connected to another side of the ring portion to physically touch the blocking protrusion portion and surrounds the blocking protrusion portion and the carrying portion.

3. The mobile vehicle according to claim 2, wherein the blocking protrusion portion of the mounting sleeve has at least one first positioning structure, the carrying portion of the first damping member has at least one second positioning structure, the at least one first positioning structure and the at least one second positioning structure match each other, and the at least one second positioning structure is positioned at the at least one first positioning structure to prevent the mounting sleeve from rotating relative to the first damping member.

4. A damping assembly, configured to assemble a vehicle body with a computer host, the damping assembly comprises a mounting casing, a mounting sleeve and a damping body, the mounting casing has an accommodation space and an opening connected to the accommodation space, wherein the mounting casing comprises a plate portion and a cover portion, the plate portion is mounted on the vehicle body, the cover portion is mounted on the plate portion, so that the plate portion and the cover portion together form the accommodation space, and the opening is located on the cover portion, the mounting sleeve is located in the accommodation space, and partially passes through the opening, the mounting sleeve is mounted on the computer host, wherein the mounting sleeve comprises a sleeve portion and a blocking protrusion portion, the blocking protrusion portion protrudes from a periphery of the sleeve portion, the damping body is interposed between the mounting casing and the mounting sleeve, wherein the damping body comprises a first damping member and a second damping member, the first damping member is interposed between the mounting sleeve and the plate portion, the second damping member is stacked on the first damping member and surrounds the mounting sleeve, wherein the damping body comprises a first damping member and a second damping member, the first damping member is interposed between the mounting sleeve and the plate portion, the second damping member is stacked on the first damping member and surrounds the mounting sleeve, the first damping member comprises a base portion and a carrying portion, the base portion is stacked on the plate portion, the carrying portion protrudes from the base portion, the mounting sleeve is stacked on the carrying portion, the second damping member comprises a ring portion, a first extension portion and a second extension portion, the ring portion physically touches the sleeve portion and surrounds a part of the sleeve portion, the first extension portion is connected to a side of the ring portion, the first extension portion passes through the opening to physically touch the sleeve portion and surround another part of the sleeve portion, the second extension portion is connected to another side of the ring portion to physically touch the blocking protrusion portion and surround the blocking protrusion portion and the carrying portion.

\* \* \* \* \*